Dec. 19, 1933.                R. C. REMY                1,940,101
                      VARIABLE SPEED TRANSMISSION
                       Filed July 27, 1932      4 Sheets-Sheet 1

INVENTOR
Robert C. Remy
BY
David Heller
ATTORNEY

Dec. 19, 1933. R. C. REMY 1,940,101
VARIABLE SPEED TRANSMISSION
Filed July 27, 1932 4 Sheets-Sheet 2

INVENTOR
Robert C. Remy
BY
ATTORNEY

Dec. 19, 1933.      R. C. REMY      1,940,101
VARIABLE SPEED TRANSMISSION
Filed July 27, 1932      4 Sheets-Sheet 4

INVENTOR
Robert C. Remy
BY
ATTORNEY.

Patented Dec. 19, 1933

1,940,101

UNITED STATES PATENT OFFICE 1,940,101

VARIABLE SPEED TRANSMISSION

Robert C. Remy, Mansfield, Ohio

Application July 27, 1932. Serial No. 624,919

44 Claims. (Cl. 74—34)

This invention relates to improvements in the transmission of power from a prime mover to a driven member and deals more particularly with a transmission adapted for use in automotive work.

In automotive work, the usual type of transmission employs a gear set of three or four ratios and these are successively used to firstly overcome the inertia of the car, then to accelerate the movement thereof and finally to drive the car at normal speeds. These gear ratio changes are usually accomplished by shifting certain of the gears and each time such shifting is done a clutch between the gear set and power unit must be thrown out. Whether the clutch is manually or automatically operated there is delay in bringing a car to speed from an inert position.

It is therefore an object of the present invention to provide transmission in which the proper ratio of speed transmission between the prime mover (the engine) and the driven member (the automobile propellor shaft) is attained either automatically or at the will of the operator.

A further important object is to provide a speed transmission which may be used in addition to the usual form of gear set and shift lever to immeasurably increase the flexibility of the speed range.

A further object of the invention is to provide a transmission which not only is adapted for a large number of speed ratios for heavy loads and for hill climbing, but also permits the use of a higher gear ratio in the automobile transmission. In this event when the automobile is in high gear, it can develop greater speed with less engine wear and lower fuel consumption.

These and other important objects such as simplicity of construction and silence of operation and the means for their attainment will become more apparent from the following detailed description, taken in connection with the accompanying drawings, illustrating several embodiments of the invention, and in which:

Figure 1:
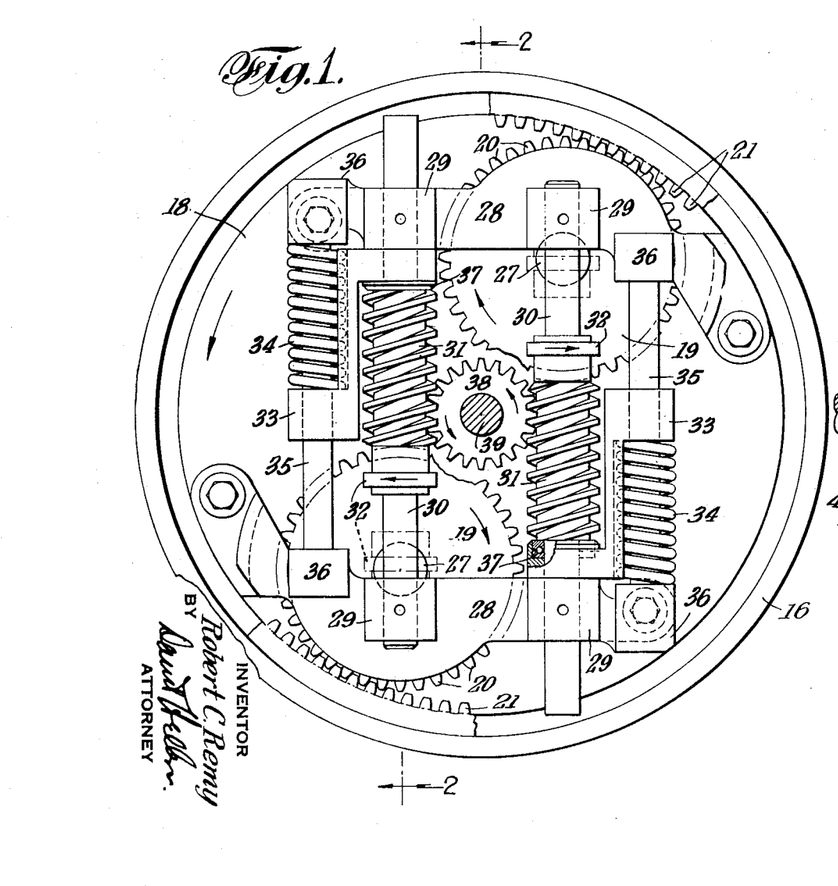
Fig. 1 is a face view of a preferred form of the invention with the cover plate removed.
Figure 2:
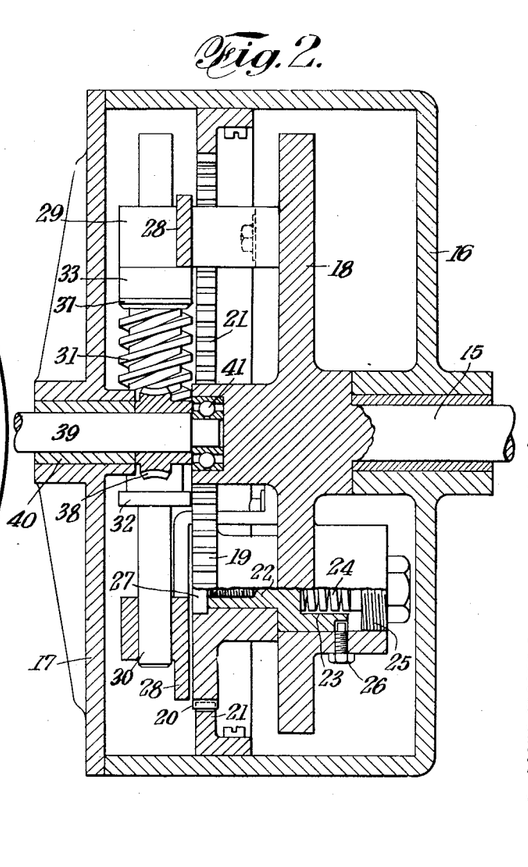
Fig. 2 is a vertical sectional view taken along line 2—2 of Fig. 1.

Describing the drawings in greater detail and referring particularly to Figs. 1 and 2, a driving shaft 15 such as would emanate from a power unit, is journalled in a fixed casing 16 having a cover plate 17. The shaft 15 is provided with an enlargement in the form of a driving disc 18 which may be integral with the shaft as shown or otherwise attached to the shaft and which carries one or more friction discs 19 provided with peripheral gear teeth 20 meshing the teeth of an internal gear 21 fixed with the stationary casing 16.

The friction discs are mounted for rotation on the studs 22 having spring seats 23 for the pressure springs 24 tensioned by the screws 25. The studs 22 are held from rotation by set screws 26 and the friction discs are retained on the studs by end screws 27, which also serve as points of rest for the friction discs 32 to prevent undue grinding of their peripheries.

Brackets 28 are secured to the driving disc and each bracket is provided with bosses 29 in which are guided worm shafts 30 which are provided with long worms 31 and friction wheels 32 the peripheries of which have contact with respective faces of the friction discs.

Slidable with each shaft 30 there is provided a spring yoke 33 acting against the free end of a coil spring 34 strung on the spring rod 35. The spring rods are carried in bosses 36 of the brackets 28.

Since the spring yokes do not rotate relative to the disc 18 there is provided between them and the portions of the worms adjacent, thrust bearing 37 to reduce friction; and similarly the various bosses and bearings may have provisions for supplying a lubricant to the rotating and sliding parts.

The worms are preferably parallel and spaced as shown and mesh with a driven worm gear 38 on the driven shaft 39 journalled in the cover plate 40 and having bearings in the end of the drive shaft at 41.

Figures 3, 4, 5:
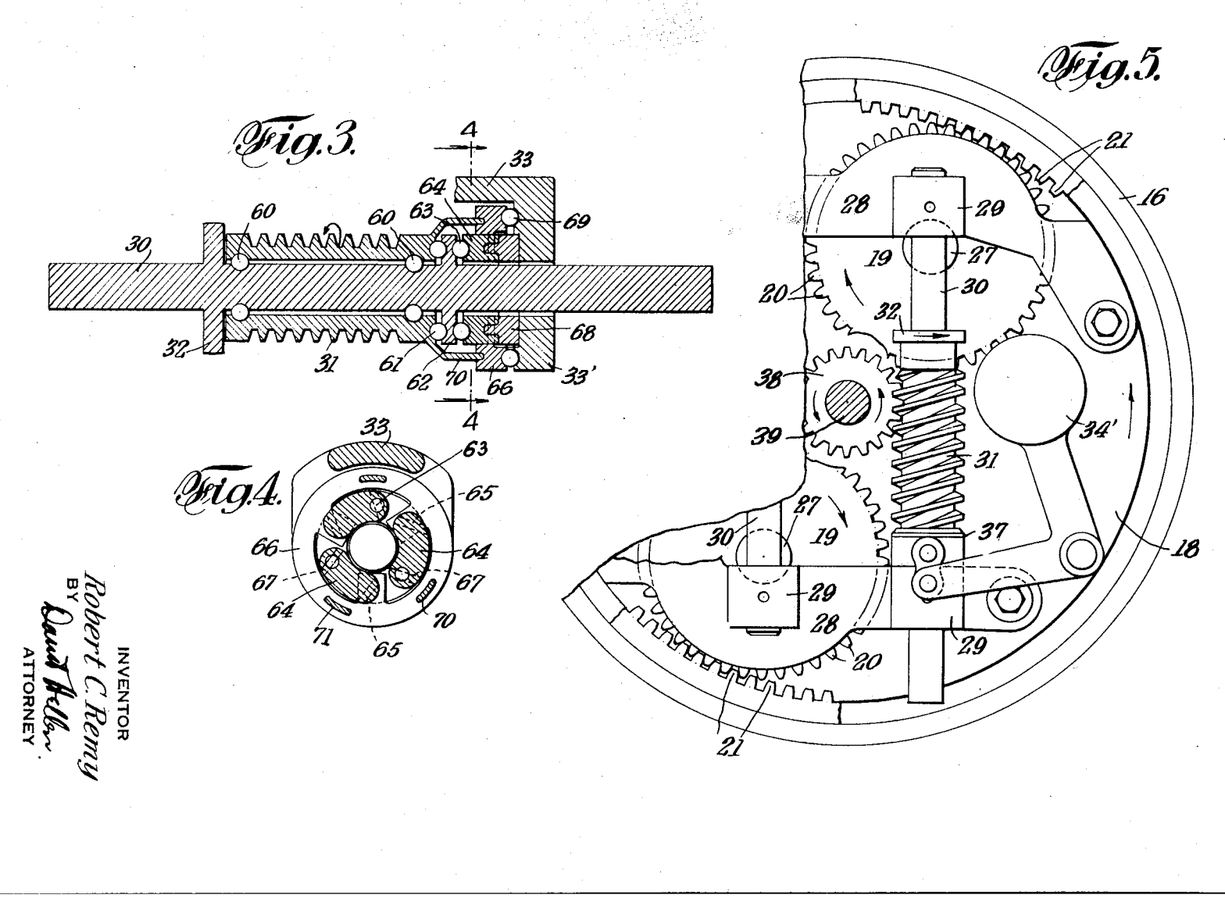
Fig. 3 is a longitudinal sectional view of means for controlling the coefficient of friction of the worm shaft.
Fig. 4 is a cross sectional view taken along line 4—4 of Fig. 3.
Fig. 5 is a partial face view of a modified form of transmission.

Figs. 3 and 4 illustrate means for controlling the co-efficient of friction of the worm shaft. The worm shaft 30 provided with a friction disc 32, mounts the worm 31 by means of anti-friction bearings 60. The end thrust on the worm is transmitted by a thrust bearing 61 to a plate 62 carried by the worm shaft and then to a three ball thrust bearing 63. Three links 64 are each provided with a seat for the balls of the bearing 63 and have their left hand faces parallel to the plate 62. Portions of these links have points of bearing as at 65 on inreaching portions of the thrust block 66 and other portions of these links have bearing points as at 67 on the bearing block 68.

The block 68 transmits its thrust directly to the portion 33' of the spring yoke 33 and the block 66 transmits its thrust to that portion through thrust balls 69. The balls of the thrust bearing 63 may be provided with a retaining cage or other means to prevent their displacement.

The worm 31 is provided with a plurality of fingers 70, the ends of which have engagement with depressions 71 in the block 66 and which directly transmit to the block 66 any torque of the worm. This torque is then transmitted thru the links 64 to the blocks 66 and 68.

It will be clearly seen, therefore, that any thrust on the worm 31 is transmitted through the balls 63 to the links 64 bridging the two thrust bearings 66 and 68 and that by simply rotating the plate 62 the entire load can be shifted from the thrust bearing 66 to the thrust bearing 68 and vice versa. Also when the load is on the thrust block 68, the frictional resistance to the rotation of the worm and the worm shaft will be greater than when all the thrust is carried by the thrust block 66. It may be stated that when the coefficient of friction between the worm and worm gear is at its lowest, they will still be non-reversible if all the thrust is carried by the block 68 and also when the coefficient of friction between the worm and worm gear is at its highest, they will still be reversible if all the load is on the block 66. This can be obtained by proper design of the lead of the worm and of the thrust bearings.

Fig. 5 shows the transmission in substantially the same form as in Fig. 1, except that centrifugal weights 34' are used, in place of the compression springs, to produce the upward thrusts on the worm-shafts 30.

Figures 6, 7, 8:
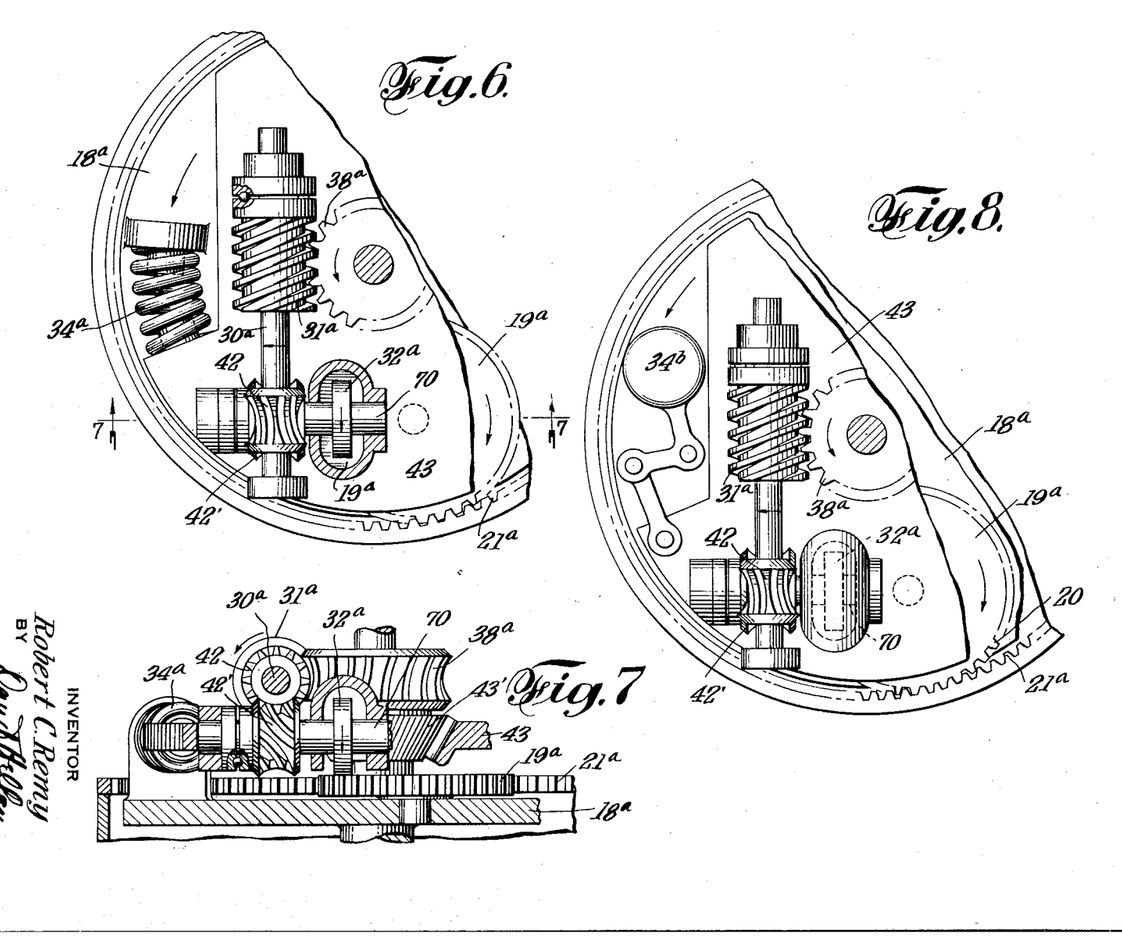
Fig. 6 is a partial face view of a further modification of the invention.
Fig. 7 is a sectional view along line 7—7 of Fig. 6.
Fig. 8 is a partial face view of another modification of the invention.

Figs. 6 and 7, show a multiple system of the worm and worm-gear-release. In this design a "floating disc" 43 mounted on a thrust-bearing 43' of the driving-disc 18$^a$ (as shown in Fig. 7), has the freedom of a few degrees of rotation over the driving-disc 18$^a$. A compression spring 34$^a$ normally holds the floating-disc 43 in an "advanced" position relative to the driving-disc 18$^a$. On the driving-disc 18$^a$ are mounted planet-gears 19$^a$ which are in mesh with the stationary internal gear 21$^a$. The surfaces of the planet-gears 19$^a$ are in contact with the friction-discs 32$^a$ which extend through the slots in the floating-disc 43. On the floating-disc are mounted the main worms 31$^a$ which are in mesh with the driven worm-gear 38$^a$. On one end of each worm-shaft 30$^a$ is mounted a smaller worm-gear 42. Each of these worm-gears is in mesh with a secondary worm 42' mounted on the control shaft 70 on which the friction-disc 32$^a$ is mounted. The extent of rotation of the floating disc 43 over the driving disc 18$^a$ is such as to bring the friction-disc 32$^a$ from the edge of the planet gear 19$^a$ to its center.

Fig. 8, shows the same arrangement of the multiple system as shown in Fig. 6 with the exception that centrifugal weights 34$^b$ are used, instead of compressing springs, to hold the floating disc 43 normally in an advanced position with respect to the driving-disc 18$^a$.

Figures 9, 10, 11, 12:
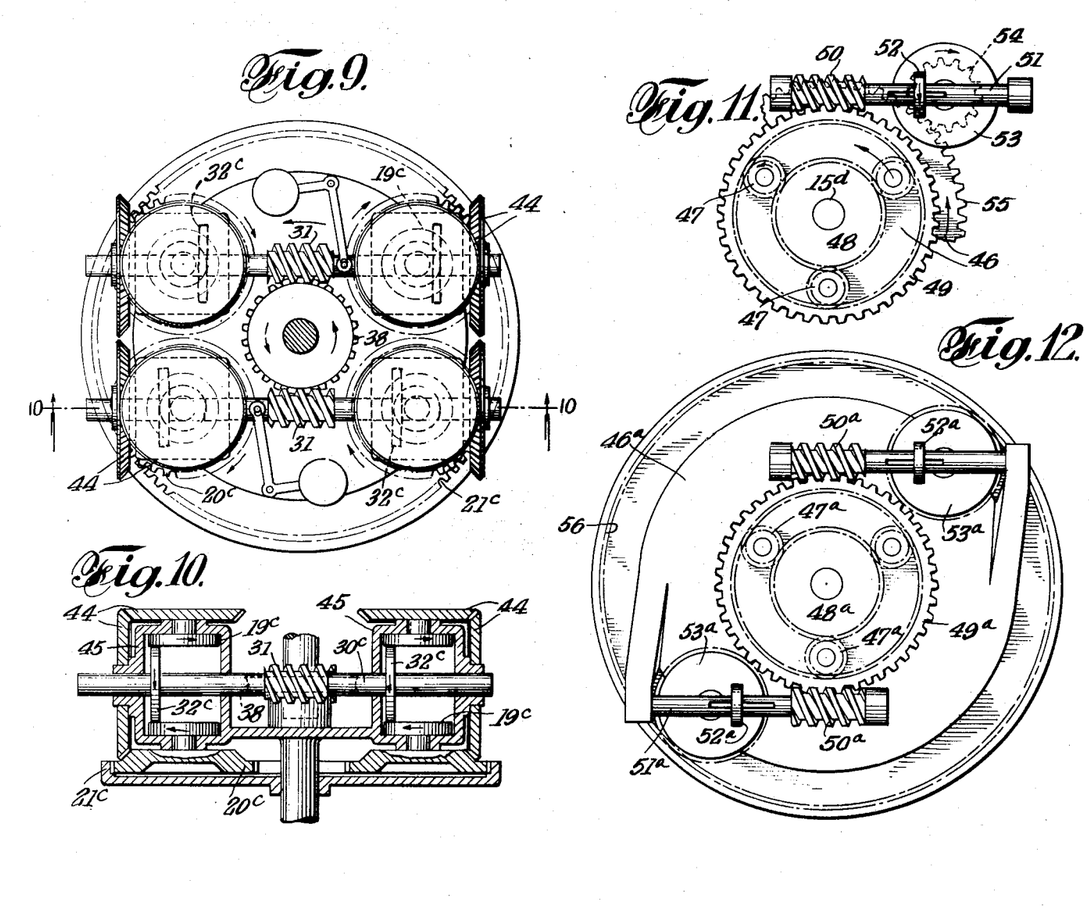
Fig. 9 is a face view of still another modification showing multiple friction disc control.
Fig. 10 is a sectional view thereof along line 10—10 of Fig. 9.
Figs. 11, and 12 are face views showing the use of planetary gearing.

Figs. 9 and 10 show a form of the transmission similar to that shown in Fig. 5. In this design, however, in order to give greater traction to the friction wheels, a wheel 32$^c$ is mounted on each end of each worm-shaft 30$^c$. Each friction wheel 32$^c$ is in frictional contact with two control friction discs 19$^c$, which are geared together thru intermediate gears 44 having spiral bevel teeth. All of the gears are operated by the planet-gears 20$^c$ having teeth in mesh with the stationary internal gear 21$^c$ mounted on the inside of the casing. If desired, each friction-wheel 32$^c$ may be placed in contact with four control discs 19$^c$, by placing the other two control-discs one on each side of the friction wheels 32$^c$. Also, in these figures the friction wheels 32$^c$ and the control-discs 19$^c$ are shown encased in oil-proof housings 45, so that the friction surfaces may be kept dry. As the dry coefficient of friction is several times the coefficient of friction of lubricated surfaces, this further increases the control over the discs.

Fig. 11 shows an alternate form of the transmission. In this form, the driving-disc 46 carries planetary gears 47 which are in mesh with a sun-gear 48 mounted directly on the driven shaft 15$^d$. The planetary gears 47, are also in mesh with a floating ring gear 49, which, is in mesh with a worm 50 mounted on a non-sliding shaft 51. On this worm-shaft 51 is a friction wheel 52 which is shown in this case to be slidably splined on the shaft 51, and revolving with it. The friction wheel 52 may be controlled by a yoke and levers (not shown) and manually operated by an operator. The friction wheel 52 is in contact with a control friction-disc 53 which is on a fixed mounting. This control-disc 53 is provided with gear teeth 54 which are in mesh with gear teeth 55 on the periphery of the driving disc 46.

Fig. 12 shows another alternate form of the transmission. The driving-disc 46$^a$ carries planet-gears 47$^a$ which are in mesh, with the driven sun gear 48$^a$, and with a floating ring-gear 49$^a$. The floating ring-gear 49$^a$ carries on its outside worm-gear teeth which are in mesh with two worms 50$^a$ mounted on the driving disc 46$^a$. Mounted on the driving disc 46$^a$ are two control discs 53$^a$ which have teeth in mesh with a stationary internal gear 56. A slidably splined friction disc 52$^a$, in contact with one of the control discs 53$^a$, is mounted on each worm shaft 51$^a$, and its position may be controlled manually by the operator through a system of yokes and levers (not shown).

While in most of the drawings in this disclosure the worms have been shown on the driving end of the transmission, and the worm gears on the driven end, yet it should be understood that in certain cases, the transmission will operate satisfactorily with the worms on the driven end, and the worm-gear on the driving end.

It should also be stated that while it is here indicated that the power used to operate or control the worm-shafts in their rotation comes from the same source of power that drives the transmission as a whole, yet the worm-shafts can be driven, or controlled independently by some other source of power, or by some other retarding effect and still come within the spirit of the invention.

In operation, in Figs. 1 and 2, the driving disc 18 is rotated counter-clockwise by the engine, the brackets 28, worms 31, etc., being carried around with the driving disc 18. Now if there is no load on the driven shaft 39 and driven worm-gear 38, the transmission will assume its normal position as the tension in the springs 34 will force the worm shafts 30 up till the friction wheels 32 occupy the positions indicated by the dotted lines where the friction discs 32 rest on the non-revolving screws 27. In this position there is no rotation of the worm shafts 30 on their axes, and consequently the worms 31 drag the driven worm gear 38 around with them, resulting in a 1:1 ratio of transmission from the shaft 15 to the shaft 39. There is no movement of any of the parts, except that of the planet gears 19 which are in mesh with the fixed internal gear 21. The tension remaining in the springs 34 in their extended form determines the load that can be carried by the transmission in the 1:1 ratio. If the load on the driven shaft 39 and the driven worm gear 38 is increased beyond this predetermined amount, the worms 31 and the worm-gear 38 begin to act like a rack and pinion, and each worm is forced to slide until the load tending to move the worms is balanced by the increased tension in the compression springs 34. However, since each worm shaft 30 under this extra load has been moved somewhat, the friction discs 32 will be placed in positions somewhere on the face of the control discs 19. The friction wheels 32 will now be in frictional contact with the surfaces of the revolving planet gears 19, and the worm shafts 30 and worms 31 will begin to revolve on their axes. The worms 31 will revolve in the direction indicated, and the driven shaft 39 will therefore begin to revolve at a lesser speed than previously. The rotation of the driven shaft 39 will depend, of course, on the driven load. In this manner, because of the rotation of the worms 31 and their releasing action on the worm gear 38, the driving shaft 15 over-runs the driven shaft 39. Fig. 1, shows the load having forced the worm shafts 30 down to their lowest position and the lowest ratio of transmission.

It should be here stated that the teeth on the worms 31 are designed with a lead angle approximately equal to the co-efficient of friction between the gear teeth surfaces. The load on the driven worm gear 38 will therefore tend itself to rotate the worms just as much as the friction between the surfaces tends to keep the worms from rotating, resulting in an approximate balancing of the torques. A slight additional torque, therefore, supplied by the friction discs 32, will be sufficient to rotate the worm shafts 30 and release the load as desired. The surfaces of the friction discs 32 and of the planet gears 19 are held firmly together by the springs 24 back of the planet discs 19, so that if the torques are not quite balanced, the friction discs 32 will supply sufficient additional torque. However, the power necessary to be transmitted through the frictional surfaces in order to supply the additional torque required, is but a small fraction of the torque being carried by the transmission as a whole. The actual amount of power transmitted through the frictional surfaces is equal to the power being carried by the transmission multiplied by the difference between the lead angle of the worms and the coefficient of friction. In fact, when the tangent of the lead angle of the worms exactly equals the co-efficient of friction involved, no power is transmitted through the friction surfaces at all, regardless of the load the transmission is carrying, the position of the friction discs controlling only the ratio of transmission. In actual practice, however, the coefficient of friction will be found to vary slightly under different conditions, and the lead angle of the worms should then be designed to equal the average co-efficient of friction.

The co-efficient of friction is found to vary according to the lubrication, the speed, the pressure, and the temperature, of the various parts. If the friction should vary too much from the average co-efficient of friction, an arrangement such as shown in Figs. 3 and 4 can be used. This arrangement is used to keep the co-efficient of friction constant by varying the friction in the thrust bearing as the friction between the gear teeth varies. In operation, balls 63 rest normally in the positions shown, transmitting all of the thrust of the worm 31 onto the thrust bearing 68. In this position, as stated before, the worm will not revolve regardless of the co-efficient of friction between the worm gear teeth. There is however, a normal rotary torque on the worm. Now if the wheel 32 rotates shaft 30 in the direction of the arrow, plate 62 will roll the balls 63 along their races on links 64 and begin to shift the load from the thrust bearing 68 to the ball thrust bearing 66. At some point along the way, the friction will be reduced sufficiently to permit the worm 31 to begin to rotate, with the bearings 66 and 68, under the rotary torque on worm 31. There will be practically no effort required to rotate friction wheel 32 as it is mounted in ball bearings and there is no actual work done by rotating it. Furthermore, the worm 31 will revolve just as fast as the friction wheel 32 revolves for if it revolves faster, the balls 63 will be rolled back on their links 64 and more of the load will again be placed on the plain thrust bearing 68, which will retard the speed of rotation of the worm. Thus, regardless of the thrust being carried by the worm, or the variations in the co-efficient of friction involved, the friction wheels 32 will control the rotation of the worm 31 with little effort.

A more flexible form is shown in Fig. 5. In this design, centrifugal weights 34' are used to produce the thrust on the worm shafts 30 instead of the compression springs. By designing the weight arms properly, the identical torques can be produced in each (vertical) position of the worms as with the compression springs at full speed of the engine. The weight arms should be designed so that they will produce more and more of an upward thrust on the worm shafts 30 as the centrifugal weights 34' are drawn in toward the center, by the increased load. Thus, either the spring type, or the centrifugal type, would be equally satisfactory when the engine was going at full speed. But if the engine were running slower and consequently developing less power, then, if the centrifugal weights were used, they would require less of a load than the springs would require, to shift the worm shafts 30 down. In this design, therefore, the ratio of transmission is automatically determined, not only by the load carried by the driven shaft, but also by the speed of the motor which indicates the power being developed.

Another feature is that the clutch could be eliminated from operation in driving a car equipped with this design. If the worm shafts 30 were allowed to descend to a point where the rotation furnished by the friction wheels 32 was sufficient for the worms 31 to drive the worm gear 38 backward as fast as the driving disc 18 went forward, this would result in a neutral position, as the driven worm gear 38 would remain stationary. Small springs (not shown) could then hold the centrifugal weights 34' in this position, while the engine was just idling. If the driver wished to start the car, all he would have to do would be to open the throttle. For as the engine picked up speed, the centrifugal weights 34' would tend to move out, and move the worm-shafts 30 upward, thus reducing the rotation of the worms 31 and starting the driven worm gear 38 in motion. Then after the inertia of starting was overcome, the transmission would gradually shift itself up to the 1:1 ratio as the load was reduced. This arrangement would not only give the car greater flexibility, but also would give the car the best possible acceleration, because the proper ratio would be furnished at all times to deliver the maximum possible thrust on the car continuously and according to the power developed by the engine. Figs. 6 and 7 show a multiple control mechanism of the worm-release idea, in which system a secondary worm 42' is used to control the rotation of the primary worm-shaft 30$^a$, the same as the primary worm 31$^a$ is used to control the rotation of the driven worm-gear 38$^a$, the secondary worm-gear 42' being in mesh which in turn, is controlled in its rotation by the friction wheel 32$^a$. Now, when a heavy load is placed on the driven shaft, the worm-gear 38$^a$ tends to drive the worms 31$^a$ backward, against the increased torque, but as the primary and secondary worms and shafts are all mounted on a floating disc 43, this disc is forced back against the compressing springs 34$^a$ which transmits the driving torque of the engine from the driving-disc to the floating disc and then on to the driven worm-gear. When the compression springs 34$^a$ yield, under the driven load, the floating disc 43 assumes a "retarded" position with respect to the driving disc 18$^a$, but as the floating disc 43 is forced back, the friction wheels 32$^a$ are carried over the surface of the planet gears 19$^a$ to a point farther from their centers with the result that rotation is begun in the worm shafts 70 and 30$^a$ which tends to release the worm-gear 38$^a$ from following the driving worms 31$^a$ and thus allows the driving shaft to over-run the driven shaft in accordance with the load on the driven shaft. It should be clearly kept in mind that the use of a second worm and worm-gear for controlling the torque in the primary worm-shaft not only reduces the torque of the primary worm shaft by the amount of the ratio of the worm and worm gear, but directly controls it according to how closely the lead angle of the secondary worm approaches the co-efficient of friction involved.

Fig. 8 shows the same arrangement as is shown in Fig. 6 with the exception that centrifugal weight 34$^b$ are used to maintain the normally advanced position of the floating disc 43 with respect to the driving disc 18$^a$. If the weight arms are properly designed, the ratio of transmission will be determined by the power being developed by the engine as well as by the load being carried by the driven shaft.

Figs. 9 and 10 show a design similar in operation to that shown in Fig. 5. However, in this design, there are two friction wheels 32$^c$ on each worm shaft, and as each friction-wheel is in contact with two (or more) friction control-discs 19$^c$, and as all the friction surfaces are enclosed in oil-proof housings 45, the control of the friction discs 32$^c$ is thereby greatly increased.

Fig. 11 shows an alternate form of the transmission. As the driving disc 46 revolves, if the sun, or driven-gear 48 remains stationary, the planet gears 47 will revolve on their shafts as they travel around with the driving disc 46. The planet gears 47 will also drive the internal ring gear 49 in the same direction but faster than the driving disc 46 is rotating. Now as the control disc 53 is constantly rotating, being geared to the driving disc 46, then, if the friction wheel 52 is properly set on the control-disc 53, it will apply sufficient rotation to the worm-shaft 51 so that the worm 50 will revolve at just the speed that the ring-worm-gear 49 requires. This is the neutral position. Now, if the friction wheel 52 is moved slightly toward the center of the control disc 53, this will slightly retard the speed of rotation of the worm-shaft 51 and worm 50, and also the ring-gear 49. This will force the sun gear 48 to rotate. Any load on the driven or sun gear 48 will be transmitted to the worm 50 and carried by its thrust-bearing.

Therefore, by properly positioning the friction wheel 52 on the control disc 53, any desired ratio of transmission may be obtained.

Fig. 12 shows a design similar to that shown in Fig. 11 with the exception that the worm-shafts 51$^a$ and the control discs 53$^a$ are carried on the driving disc 46$^a$, the control-discs being in mesh with a stationary internal gear 56 mounted on the inside of the casing. As the driving disc 46$^a$ rotates, if the sun-gear 48$^a$ remains stationary, then as the driving disc drives the planet gears 47$^a$ around the sun-gear, the planet gears rotate on their shafts and drive the floating ring gear 49$^a$ in the same direction that the driving disc is rotating, only a little faster. Now as the control discs 53$^a$ are constantly rotating, being geared to the stationary internal gear 56, then, if the friction wheels 52$^a$ are properly set on the control discs 53$^a$, they will apply sufficient rotation to the worm shafts 51$^a$, so that the worms 50$^a$ will revolve at just the speed required by the ring-gear 49$^a$. This is the neutral position. To start the driven-gear 48$^a$ in motion, the slidably splined friction wheels 52$^a$ are moved a little closer to the center of the control discs 53$^a$. This will slightly retard the rotation of the worm shafts 51$^a$ and worms 50$^a$, and also the speed of the ring gear 49$^a$, which will force the driven gear 48$^a$ to rotate. If the friction wheels are moved by the operator to the center of the control-discs there will be no rotation of the worm shafts, ring-gear, or planet-gears and consequently the whole transmission will revolve as a unit, except for the idle rotation of the control disc. The advantage of this system is that the ring-gear travels past the worms much slower than in any of the other designs, which permits a slower rotation of the worm-shafts. In fact, by proper design in this system, the worm-shafts need revolve at no greater speed than that at which the driving engine revolves.

This form may be used in conjunction with the floating-disc arrangement shown in Figs. 6 and 7, or any of the designs shown in this specification may be used in conjunction with any other design shown, without departing from the spirit of the invention.

While the slidably-splined friction-discs are only shown in Figs. 11 and 12, it should also be understood that any of the foregoing designs can be equipped with this type of control, which is manually operable by the operator, also the friction discs in these latter two designs can be controlled automatically by springs or centrifugal weights.

Although I have described my improvement with considerable detail and with respect to certain particular forms of my invention, I do not desire to be limited to such details since many changes and modifications in the form, arrangement, proportions and sizes thereof may well be made without departing from the spirit and scope of my invention in its broadest aspect.

Having thus described my invention, what I claim as new and desire to secure by Letters Patent, is:

1. In a variable-speed transmission, the combination of a driving member, a driven member having worm wheel teeth, a worm mounted on the driving member and carried thereby in the same direction as that of the axis of rotation of the worm, said worm being in mesh with the worm-wheel teeth mounted on the driven member, and means for controlling any tendency of said worm to rotate thereby permitting the driving member to over-run the driven member, said rotation being controlled by means of power derived from the driving motor, said means being under the control of an operator, and being applied at least in part through a slidable friction disc mounted on the worm shaft.

2. In a variable-speed transmission, the combination of a driving member, a driven member having worm wheel teeth, a friction disc mounted on the driving member to communicate motion to the driven member, a worm also mounted on said driving member and meshing with the worm wheel teeth to rotate in the same direction as that of the axis of rotation of the worm and automatic means controlling any tendency of said worm to rotate, thereby permitting the driving member to over-run the driven member.

3. In a variable-speed transmission, the combination of a driving member, a driven member having worm wheel teeth, a worm mounted on the driving member meshing with the worm wheel teeth to rotate in the same direction as that of the axis of rotation of the worm a friction disc also mounted on the driving member to communicate motion to the driven member and automatic means controlling any tendency of said worm to rotate, thereby permitting the driving member to over-run the driven member, said rotation being automatically controlled by means of power derived from the driving motor.

4. In a variable-speed transmission, the combination of a driving member having teeth, a driven member, a worm mounted on the driven member in a manner as to be carried in the general direction of its axis of rotation, said worm being in mesh with the teeth mounted on the driving member, and means including a friction disc mounted on the worm shaft, for rotating said worm, thereby permitting the driving member to over-run the driven member, said rotation being accomplished by means of power derived from the driving motor, said means being controlled manually by the operator for a part of the time and automatically in a predetermined manner for a part of the time.

5. In a variable-speed transmission, the combination of a driving member having teeth, a driven member, a worm mounted on the driven member in such a way as to be carried in the general direction of its axis of rotation, said worm being in mesh with the teeth mounted on the driving member, a friction disc mounted on the worm shaft, and means for controlling any tendency of said worm to rotate, thereby permitting the driving member to over-run the driven member, said rotation being controlled by means of power derived from the driving motor, said means being applied through said friction disc and controlled automatically in a predetermined manner.

6. In a variable-speed transmission, the combination of a driving member having worm gear teeth, a driven member, a worm mounted on the driven member in such a way as to be carried in the same direction as its axis of rotation, said worm being in mesh with the worm-gear teeth mounted on the driving member, a friction disc mounted on the worm shaft and means for controlling any tendency of said worm to rotate, thereby permitting the driving member to over-run the driven member, said rotation being controlled by means of power derived from the driving motor, said means being applied through said friction disc and under the control of the operator and being manipulated by him at will.

7. In a variable-speed transmission, the combination of a driving member having worm gear teeth, a driven member, a worm mounted on the driven member in such a way as to be carried in the same direction as its axis of rotation, said worm being in mesh with the worm-gear teeth mounted on the driving member, a friction disc mounted on the worm shaft and means for controlling any tendency of said worm to rotate, thereby permitting the driving member to over-run the driven member, said rotation being controlled by means of power derived from the driving motor, said means being applied through said friction disc and the application of said means being controlled automatically according to the load on the driven member, by means that are automatic part of the time and manually operated part of the time.

8. In a variable-speed transmission, the combination of a driving member, a driven member, and auxiliary means for controlling the variable relation between the driving member and the driven member, said auxiliary means including shafts, a friction disc on each shaft, friction control discs mounted at right angles to said friction disc and contacted thereby, said friction discs being actuated by the power source driving the driving member, and the variable relation between the driving member and the driven member being produced by the relative movement of the friction discs and the friction control discs.

9. In a variable-speed transmission, the combination of a driving member, a driven member, and auxiliary means for controlling the variable relation between the driving member and the driven member, said auxiliary means comprising shafts, primary friction discs on each shaft, shafts at right angles to the first mentioned shafts, secondary friction discs on the second mentioned shafts contacting respective primary discs, the variable relation between the driving and driven members being produced by relative movement between the respective contacting discs, the moving discs being mounted rigidly on their shafts, the shafts moving with them, or said friction discs being slidably splined on their shafts, the position of the discs, in either case, being governed by means controlled manually by the operator, or automatically in a predetermined manner, or by a combination of automatically controlled means and manually controlled means, or by means that are controlled automatically part of the time and manually part of the time.

10. A variable-speed transmission comprising a driven member, a driving member and means to variably control the driven member, said means including a worm carried by the driving member, a worm wheel carried by the driven member, and means to control the rotation of the worm, comprising pairs of friction discs, one disc of each pair having peripheral contact with the face of the other and manual means to vary the point of contact on the face of the last mentioned discs.

11. In a variable-speed transmission, the combination of a driving member, a driven member, an auxiliary member, a worm mounted on one of the members, worm gear teeth being mounted on another member, the worm and worm-gear teeth being in mesh with each other, the action between them being in the general direction of the worm's axis of rotation, and the variable relation between the driving member and the driven member being the result of the variable motion between said worm and worm-gear teeth, said variable motion being produced by the variable rotation of the worm, said rotation being actuated or controlled, through frictional contact methods, by means of power derived from the driving motor, the application of said means being controlled manually by the operator part of the time and automatically part of the time.

12. In a variable-speed transmission, the combination of a drive shaft, a driven shaft, a driving member mounted rigidly on the drive shaft, a worm and worm shaft mounted on the said driving member, so as to be carried by the driving member in the same direction as the axis of rotation of said worm, a worm-gear mounted on the driven shaft and in mesh with said worm, and means for rotating said worm so as to permit the drive shaft to over-run the driven shaft, said rotation being accomplished by means of power derived from the driving motor applied through frictional contact methods, said frictional contact methods including, friction discs mounted rigidly on said worm shaft, control-discs controlled thereby, said friction control-discs being actuated by the power source, and the load on the driven shaft, as transmitted by the worm-gear and worm to the worm shaft, producing an end-thrust on the worm shaft and moving said worm shaft longitudinally against a yieldable counteracting force, thereby automatically carrying each friction disc across the face of the said friction control-discs.

13. In a variable-speed transmission, the combination of a drive shaft, a driven shaft, a driving member mounted rigidly on the drive shaft, a worm and worm shaft mounted on the said driving member so as to be carried by the driving member in the same direction as the axis of rotation of the said worm, a worm-gear mounted on the driven shaft and in mesh with said worm, and means for rotating said worm so as to permit the drive shaft to over-run the driven shaft, said rotation being accomplished by means of power derived from the driving motor applied through frictional contact methods, said frictional contact methods including, the friction discs slidably splined on said worm shaft, said friction discs operating in unison, friction control-discs controlled thereby, the friction control-discs being actuated by a power source, the friction discs being movable along said worm shaft and across the face of said friction control-discs, so that the position of the friction discs slidably splined on the worm shaft can be controlled at will manually part of the time and automatically part of the time.

14. In a variable-speed transmission, the combination of a drive shaft, a driven shaft, a driving member mounted rigidly on the drive shaft, a worm and worm shaft mounted on the driving member so as to be carried by the said driving member in the same direction as the axis of rotation of said worm, a worm-gear mounted on the driven shaft and in mesh with said worm, and means for rotating and for controlling the rotation of said worm, said rotation being accomplished by means of using teeth on the worm and worm-gear of a lead angle the tangent of which is greater than the coefficient of friction necessary to be overcome, said rotation of the worm being controlled, or retarded, by means of power derived from the driving motor being applied through frictional contact methods, said frictional contact methods including, friction discs mounted rigidly on said worm shafts, friction control-discs contacted thereby, said friction control-discs being actuated by the driving motor, and the load on the driven shaft, as transmitted by the worm-gear and worm to the worm shaft, producing an end-thrust on the worm shaft and moving said worm shaft longitudinally against a yieldable counteracting force, thereby automatically carrying each friction disc across the face of the said friction control-discs.

15. In a variable-speed transmission, the combination of a drive shaft, a driven shaft, a driving member mounted rigidly on the drive shaft, a worm and worm shaft mounted on the driving member so as to be carried by the said driving member in the same direction as the axis of rotation of said worm, a worm-gear mounted on the driven shaft and in mesh with said worm, and means for rotating and for controlling the rotation of said worm, said rotation being accomplished by means of using teeth on the worm and worm-gear of a lead angle whose tangent is larger than the coefficient of friction necessary to be overcome, said rotation of the worm being retarded by means of power derived from the driving motor, said means being applied through frictional contact methods, said frictional contact methods including friction discs slidably splined on said worm shaft, said friction discs operating in unison, friction control-discs contacted by the friction discs, the friction control-discs being actuated, directly or indirectly, by the driving motor, the friction discs also being movable along said worm shaft and across the faces of said friction control-discs, so that the position of the friction discs slidably splined on the worm shaft can be controlled at will by an operator part of the time and automatically part of the time.

16. In a variable-speed transmission, the combination of a drive shaft, a driven shaft, a driven member mounted rigidly on the driven shaft, a worm and worm shaft mounted on the said driven member so as to be carried by the driven member in the same direction as the axis of rotation of said worm, a worm-gear mounted on the driving shaft and in mesh with said worm, and means for rotating said worm so as to permit the drive shaft to over-run the driven shaft, said rotation being accomplished by means of power derived from the driving motor, said means being applied through frictional contact methods, said frictional contact methods including friction discs mounted rigidly on said worm shaft, friction control-discs contacted by the friction discs, said friction control-discs being actuated by the driving motor, and the load on the driven shaft, producing an end-thrust on the worm shaft and moving said worm shaft longitudinally against a yieldable counteracting force thereby automatically carrying each friction disc across the faces of the said friction control-discs.

17. In a variable-speed transmission, the combination of a drive shaft, a driven shaft, a driven member rigidly mounted on the driven shaft, a worm and worm shaft mounted on the said driven member so as to be carried by the driven member in the same direction as the axis of rotation of said worm, a worm-gear mounted on the drive shaft and in mesh with said worm, and means for rotating said worm so as to permit the drive shaft to over-run the driven shaft, said rotation being accomplished by means of power derived from the driving motor, and applied through frictional contact methods, said frictional contact methods including friction discs slidably splined on said worm shafts, said friction discs operating in unison, friction control-discs contacted by the friction discs, the friction control-discs being actuated by the driving motor, the friction discs being movable along said worm shaft and across the faces of said friction control-discs, so that the position of the friction discs slidably splined on the worm shaft can be controlled at will by an operator, part of the time, and automatically controlled part of the time.

18. In a variable-speed transmission, the combination of a drive shaft, a driven shaft, a driven member mounted rigidly on the driven shaft, a worm and worm shaft mounted on the said driven member so as to be carried by the said driven member in the same direction as the axis of rotation of said worm, a worm-gear mounted on the drive shaft and in mesh with said worm, and means for rotating and for controlling the rotation of said worm, said rotation being accomplished by means of teeth on the worm and worm-gear of a lead angle the tangent of which is greater than the coefficient necessary to be overcome, said rotation of the worm being retarded, by means of power derived from the driving motor, and said rotation being applied through frictional contact methods, said frictional contact methods including, friction discs mounted rigidly on the said worm shaft, friction control discs contacted thereby, said friction control-discs being actuated by the driving motor and the load on the driven shaft, as transmitted by the worm-gear and worm to the worm shaft, producing an end-thrust on the worm shaft and moving said worm shaft longitudinally against a yieldable counteracting force thereby automatically carrying each friction disc across the faces of the said friction control-discs.

19. In a variable-speed transmission, the combination of a drive shaft, a driven shaft, a driven member mounted rigidly on the driven shaft, a worm and worm shaft mounted on the said driven member so as to be carried by the said driven member in the same direction as the axis of rotation of said worm, a worm-gear mounted on the drive shaft and in mesh with said worm, and means for rotating and for controlling the rotation of said worm, said rotation being accomplished by means of teeth on the worm and worm-gear of a lead angle the tangent of which is greater than the coefficient necessary to be overcome, said rotation of the worm being controlled, by means of power derived from the driving motor, said means being applied through frictional contact methods, said frictional contact methods including, friction discs slidably splined on said worm shaft, said friction discs operating in unison, control-discs contacted by the friction discs, the friction control-discs being actuated by the driving motor, the friction discs also being movable along said worm shafts and across the faces of said friction control-discs, so that the position of the friction discs slidably splined on the worm shaft can be controlled at will by an operator, part of the time, and automatically controlled part of the time.

20. In a variable-speed transmission, the combination of a driving member, a driven member, and at least one intermediate floating member, one of said floating members, being mounted so as to be independent to a limited extent of the rotation of the driving member and the driven member, a worm mounted on the driving member in such a way as to be carried by the said driving member in a direction parallel to the axis of rotation of the worm, a worm-gear mounted on the driven member and in mesh with said worm, and means for rotating or controlling the rotation of said worm so as to permit the driving member to over-run the driven member, said means including a friction disc mounted on the driving member, which directly controls the rotation of said worm, said friction disc being in frictional contact with a friction control disc mounted on said floating member, said friction control-disc being actuated by the driving motor, and said floating member being controlled, in its position with respect to the driving member, manually by an operator, so that the floating member can be retarded or advanced with respect to the rotation of the driving member.

21. In a variable-speed transmission, the combination of a driving member, a driven member and at least one intermediate floating member, said floating member being mounted so as to be independent to a limited extent of the rotation of the driving member and of the driven member, a worm mounted on the floating member in such a way as to be carried by the floating member in a direction parallel to the axis of rotation of the worm, a worm-gear being mounted on the driven member and in mesh with said worm, and means for rotating said worm so as to permit the driving member to over-run the driven member, said means including a friction disc mounted on the floating member, said friction disc controlling the rotation of said worm, a friction control-disc contacted thereby and actuated by the driving motor, said friction control-disc being mounted on the driving member in such a position that when a load is put on the driven member and transmitted by it through the worm-gear to the worm mounted on the floating member, that the load tends to act against springs, or centrifugal weights, or any other counteracting force, normally used to keep the floating member in a definite position relative to the driving member, and causes the floating member to tend to change its normal position with respect to the driving member, said tendency drawing the said friction disc across the face of the said friction control-disc, thus automatically imparting rotation to the worm, and allowing the driving member to rotate faster than the driven member.

22. A variable-speed mechanism, including a driving member, a driven member, at least one auxiliary member, a worm gear mounted on one of the auxiliary members, a worm mounted on a worm shaft, said worm and worm shaft being mounted on another member in such a way as to be carried by said member in the same direction as the axis of rotation of the worm, said worm shaft carrying at least one worm gear, each of the last mentioned worm-gears being in mesh with another worm carried by another worm shaft, the first mentioned worm shaft and the second mentioned worm shaft being units of a series of worm shafts in mesh with each other, the last worm shaft, in the series carrying a friction disc, rotation, or control of rotation of which controls the variable-speed relation between the driving member and the driven member, rotation of said friction discs being effected or controlled by means of power derived from the driving motor.

23. A variable speed transmission comprising a driving member, a driven member, a pair of worms carried by the driving member, a worm wheel carried by the driven member and meshing with the mentioned worms and automatic means on the driving member for rotating the worms on their longitudinal axis to a degree commensurate with the resistance to rotation of the driven member, said means being applied through friction discs mounted on the worm shafts.

24. A variable speed transmission comprising a driving member, a driven member, a pair of worms carried by the driving member, a worm wheel carried by the driven member and meshing with the mentioned worms and means, comprising friction discs on the driving member and friction wheels on the worms, for rotating the worms to a degree commensurate to the resistance to rotation of the driven member.

25. A variable-speed transmission comprising a driving member, a driven member, a pair of worms carried by the driving member, a worm wheel carried by the driven member and meshing with the mentioned worm and means to rotate the worms on their longitudinal axis to a degree commensurate to the resistance to rotation of the driven member, said means comprising a fixed member, gear means on said fixed member, friction discs on the driving member having gear means engageable with the first mentioned gear means and friction wheels on the worms engageable with the surfaces of friction discs.

26. A variable-speed transmission comprising a driving member, a driven member, a pair of worms carried by the driving member, a worm wheel carried by the driven member and meshing with the mentioned worm and means to rotate the worms on their longitudinal axis to a degree commensurate to the resistance to rotation of the driven member, said means comprising a fixed member, gear means on said fixed member, friction discs on the driving member having gear means engageable with the first mentioned gear means and friction wheels on the worms engageable with the surfaces of the friction discs, and adapted to slide longitudinally toward and away from the center of the friction discs.

27. The combination of a driving member, a driven member, a worm mounted on the driven member in such a way as to be carried in the general direction of its axis of rotation, said worm being in mesh with teeth mounted on the driving member, and means for rotating said worm, thus permitting the driving member to over-run the driven member, when, and to the extent, desired, said rotation being accomplished by means of power derived from the driving motor, said means being applied to the worm through a friction disc mounted on the worm shaft, and being controlled manually by the operator, or automatically in a predetermined manner.

28. The combination of a driving member, a driven member, a worm mounted on the driven member in such a way as to be carried in the same direction as its axis of rotation, said worm being in mesh with worm-gear teeth mounted on the driving member, and means for modifying or controlling any tendency of said worm to rotate, thus only permitting the driving member to overrun the driven member, when, and to the extent, desired, said rotation being controlled by means of power derived from the driving motor, or otherwise, said means being applied at least in part through a friction disc mounted on the worm shaft and being under the control of the driver to be manipulated by him at will.

29. A variable-speed mechanism, consisting of a driving member, a driven member, and auxiliary means, movement of which auxiliary means controls the variable relation between the driving member and the driven member, the auxiliary means being geared to one of said members by means of a worm and worm gear, movement of the auxiliary means being controlled by frictional contact methods ordinarily used for the transmission of power, including the use of a friction disc in frictional contact with another friction disc at right angles to the first friction disc, one of the friction discs being part of the auxiliary means and the other being actuated or controlled by the driving motor, or by any other means.

30. Means for controlling the variable-speed relation between the driving member and the driven member of a variable-speed mechanism, said means for controlling the operation of the mechanism including a worm and worm gear, one which is mounted on either the driving or the driven member and the other on an auxiliary member and a friction disc in frictional contact with a second friction disc, said second friction disc being actuated or controlled by the driving motor, the varying position of one of the friction discs on the surface of the other determining the variable-speed relation between the driving member and the driven member.

31. In a variable-speed transmission, the combination of a driving member, a driven member, and auxiliary means for controlling the variable relation between the driving member and the driven member, said auxiliary means including, a shaft, on which is mounted a friction disc, the friction disc being in contact with a friction control-disc mounted at right angles to said friction disc, said friction control-disc being actuated by the motor driving the driving member, and the variable relation between the driving member and the driven member being produced by the movement of the friction disc to and from the center of the friction control-disc.

32. In a variable-speed transmission, the combination of a driving member, a driven member, and auxiliary means for controlling the variable-relation between the driving member and the driven member, said auxiliary means including a shaft on which is mounted a primary friction disc, said primary friction disc being in contact with a secondary friction disc mounted at right angles to said primary friction disc, said secondary friction disc being actuated by the driving motor, and the variable relation between the driving member and the driven member being produced by the movement of the primary friction disc to and from the center of the secondary friction disc, the position of the disc being governed by means controlled manually by the operator, or automatically in a predetermined manner.

33. A variable-speed transmission in which the driven member is controlled in its variable-relation to the driving member, either directly or indirectly, by the action of a worm working against worm-gear teeth mounted on a part of the transmission other than that on which the worm is mounted, the action between the worm and the worm-gear teeth being in the general direction of the worm's axis of rotation, and means for rotating, or controlling the rotation of, said worm as desired, said means including the use of a friction disc in frictional contact with a second friction disc, said second friction disc being actuated or controlled by the driving motor, the varying position of one of the friction discs on the surface of the other determining the variable rotation of the worm, and the consequent variable speed relation between the driving and the driven members.

34. The combination of a drive shaft, a driven shaft, a driving member mounted rigidly on the drive shaft, a worm and worm shaft mounted on the said driving member so as to be carried by the driving member in the same direction as the axis of rotation of said worm, a worm-gear mounted on the driven shaft and in mesh with said worm, and means for rotating said worm so as to permit the drive shaft to over-run the driven shaft, when, and to the extent, desired, said rotation being accomplished by means of power derived from the driving-motor, said means being applied through frictional contact methods, including the use of one or more friction discs mounted on said worm shaft.

35. The combination of a drive shaft, a driven shaft, a driving member mounted rigidly on the drive shaft, a worm and worm shaft mounted on the said driving member so as to be carried by the driving member in the same direction as the axis of rotation of the said worm, a worm-gear mounted on the driven shaft and in mesh with said worm, and means for rotating said worm so as to permit the drive shaft to over-run the driven shaft, when, and to the extent, desired, said rotation being accomplished by means of power derived from the driving motor, said means being applied through frictional contact methods, including the use of one or more friction discs slidably splined on said worm shaft, and operating in unison, each friction disc being in contact with one or more friction control-discs, the friction control-discs being actuated by the driving motor, the friction discs being movable along said worm shaft and across the face, or faces, of said friction control-discs.

36. The combination of a drive shaft, a driven shaft, a driving member mounted rigidly on the drive shaft, a worm and worm shaft mounted on the driving member so as to be carried by the said driving member in the same direction as the axis of rotation of said worm, a worm-gear mounted on the driven shaft and in mesh with said worm, and means for rotating and for controlling the rotation of said worm, said rotation being accomplished by means of using teeth on the worm and worm-gear of a lead angle whose tangent is greater than the co-efficient of friction necessary to be overcome, said rotation of the worm being controlled, or retarded, when, and to the extent, desired, by means of power derived from the driving motor, said means being applied through frictional contact methods, said frictional contact methods including the use of a friction disc mounted rigidly on said worm shaft, said friction disc being in contact with a friction control-disc, said friction control-disc being actuated by the driving motor, and the load on the driven shaft, as transmitted by the worm-gear and worm to the worm shaft, producing an end-thrust on the worm shaft and moving said worm shaft longitudinally against the counteracting force of a spring, or of a centrifugal weight, thereby automatically carrying said friction disc across the face of the said friction control-discs.

37. The combination of a drive shaft, a driven shaft, a driving member mounted rigidly on the drive shaft, a worm and worm shaft mounted on the driving member so as to be carried by the said driving member in the same direction as the axis of rotation of said worm, a worm-gear mounted on the driven shaft and in mesh with said worm, and means for rotating and for controlling the rotation of said worm, said rotation of the worm being controlled, or retarded, when, and to the extent, desired, by means of power derived from the driving motor, said means being applied through frictional contact methods, including the use of a friction disc slidably splined on said worm shaft.

38. The combination of a drive shaft, a driven shaft, a driven member mounted rigidly on the driven shaft, a worm and worm shaft mounted on the said driven member so as to be carried by the driven member in the same direction as the axis of rotation of said worm, a worm-gear mounted on the driving shaft and in mesh with said worm, and means for rotating said worm so as to permit the drive shaft to over-run the driven shaft, when, and to the extent, desired, said rotation being accomplished by means of power derived from the driving motor, said means being applied through frictional contact methods, including the use of a friction disc mounted rigidly on said worm shaft, said friction disc being in contact with a friction control-disc, said friction control-disc being actuated by the driving motor, and the load on the driven shaft producing an end-thrust on the worm shaft and moving said worm shaft longitudinally against the counteracting force of a spring, or of a centrifugal weight, thus automatically carrying said friction disc across the face of the said friction control-disc.

39. The combination of a drive shaft, a driven shaft, a driven member rigidly mounted on the driven shaft, a worm and worm shaft mounted on the said driven member so as to be carried by the driven member in the same direction as the axis of rotation of said worm, a worm-gear mounted on the drive shaft and in mesh with said worm, and means for rotating said worm, so as to permit the drive shaft to over-run the driven shaft, when, and to the extent, desired, said rotation being accomplished by means of power derived from the driving motor, said means being applied through frictional contact methods, including the use of one or more friction discs slidably splined on said worm shaft, said friction discs operating in unison, each friction disc being in contact with one or more friction control-discs, the friction control-discs being actuated by the driving motor.

40. The combination of a drive shaft, a driven shaft, a driven member mounted rigidly on the driven shaft, a worm and worm shaft mounted on the said driven member so as to be carried by the said driven member in the same direction as the axis of rotation of said worm, a worm-gear mounted on the drive shaft and in mesh with said worm, a means for rotating and for controlling the rotation of said worm, said rotation being accomplished by means of using teeth on the worm and worm-gear of a lead angle whose tangent is larger than the coefficient necessary to be overcome, said rotation of the worm being controlled, or retarded, when, and to the extent, desired, by means of power derived from the driving motor, said means being applied through frictional contact methods, including the use of a friction disc mounted rigidly on the said worm shaft, said friction disc being in contact with a friction control-disc, said friction control-disc being actuated by the driving motor, and the load on the driven shaft, as transmitted by the worm-gear and worm to the worm shaft, producing an end-thrust on the worm shaft and moving said worm shaft longitudinally against the counteracting force of a spring, or of a centrifugal weight, thus automatically carrying said friction disc across the face of the said friction control-disc.

41. The combination of a drive shaft, a driven shaft, a driven member mounted rigidly on the driven shaft, a worm and worm shaft mounted on the said driven member so as to be carried by the said driven member in the same direction as the axis of rotation of said worm, a worm-gear mounted on the drive shaft and in mesh with said worm, and means for rotating and for controlling the rotation of said worm, said rotation being accomplished by means of using teeth on the worm and worm-gear of a lead angle whose tangent is larger than the coefficient necessary to be overcome, said rotation of the worm being controlled, or retarded, when, and to the extent, desired, by means of power derived from the driving motor, said means being applied through frictional contact methods, including the use of one or more friction discs slidably splined on said worm shaft, said friction discs operating in unison, each friction disc being in contact with one or more friction control-discs, the friction control-discs being actuated by the driving motor.

42. In a variable-speed transmission, the combination of a driving member, a driven member, and one or more intermediate members, one of said intermediate members, hereinafter called the floating member, being mounted so as to be independent to a limited extent, of the rotation of the driving member and the driven member, a worm mounted on the driving member in such a way as to be carried by the said driving member in a direction parallel to the worm's axis of rotation, a worm-gear mounted on the driven member and in mesh with said worm, and means for rotating, or controlling the rotation of said worm, so as to permit the driving member to over-run the driven member, when, and to the extent, desired, said means including a friction disc mounted on the driving member, which said friction disc directly controls the rotaton of said worm, said friction disc being in frictional contact with a friction control-disc mounted on the said floating member, said friction control-disc being actuated by the driving motor, and said floating member being controlled, in its position with respect to the driving member, manually by the operator through a system of levers, so that the floating member can be retarded or advanced with respect to the rotation of the driving member at the will of the operator, there being no rotation of the said worm possible through the friction discs, when the floating member is in one extreme position with respect to the driving member, but as said floating member is gradually moved toward its other limit, there being a gradually increasing rotation of the worm as the said friction disc is moved across the face of the friction control-disc, thus allowing the driving member to over-run the driven member, when, and to the extent desired.

43. In a variable-speed transmission, the combination of a driving member, a driven member and one or more intermediate members, one of said intermediate members hereinafter called the floating member, being mounted so as to be independent to a limited extent, of the rotation of the driving member and of the driven member, a worm mounted on the floating member in such a way as to be carried by the floating member in a direction parallel to the axis of the worm's rotation, a worm-gear being mounted on the driven member and in mesh with said worm, and means for rotating or controlling the rotation of said worm, so as to permit the driving member to over-run the driven member, when, and to the extent, desired, said means including a friction disc mounted on the floating member, which said friction disc directly controlling the rotation of said worm, said friction disc being in frictional contact with a friction control-disc actuated by the driving motor, said friction control-discs being mounted on the driving member in such a position that when a load is put on the driven member and transmitted by it through the worm-gear to the worm mounted on the floating member, that the load tends to act against springs, or centrifugal weights, or any other counteracting force, normally used to keep the floating member in a definite position relative to the driving member, and causes the floating member to tend to change its normal position with respect to the driving member, said tendency drawing the said friction disc across the face of the said friction control-disc, thus automatically imparting rotation to the worm, and allowing the driving member to rotate faster than the driven member.

44. A variable-speed mechanism, including a driving member, a driven member, and one or more auxiliary members, a worm-gear being mounted on one of the members, and in mesh with a worm mounted on a worm shaft, said worm and worm shaft being mounted on another member in such a way as to be carried by said member in the same direction as the worm's axis of rotation, said worm shaft carrying a worm gear, said last mentioned worm-gear being in mesh with another worm carried by another worm shaft, the first mentioned worm shaft and the second mentioned worm shaft being units of a series of worm shafts in mesh with each other, the last worm shaft in the series carrying a friction disc control of rotation of which controls the variable-speed relation between the driving member and the driven member, rotation of said friction disc being effected or controlled by means of power derived from the driving motor.

ROBERT REMY.